(12) United States Patent
Hieda (10) Patent No.: US 6,377,301 B1
(45) Date of Patent: Apr. 23, 2002

(54) IMAGE PICKUP APPARATUS HAVING DIFFERENT PROCESSING RATES FOR STILL AND MOVING IMAGES

(75) Inventor: Teruo Hieda, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 08/990,797

(22) Filed: Dec. 15, 1997

(30) Foreign Application Priority Data

Dec. 20, 1996 (JP) .............................................. 8-341647

(51) Int. Cl.$^7$ ................................................. H04N 5/76
(52) U.S. Cl. ....................................... 348/231; 348/222
(58) Field of Search .............................. 348/207, 220, 348/221, 222, 239, 231, 294, 311, 322, 323; H04N 5/225, 5/76

(56) References Cited

U.S. PATENT DOCUMENTS

| | | | |
|---|---|---|---|
| 4,901,152 A | 2/1990 | Hieda et al. | 358/209 |
| 5,206,730 A | 4/1993 | Sakai | 358/209 |
| 5,333,055 A | 7/1994 | Murata et al. | 348/239 |
| 5,382,974 A | 1/1995 | Soeda et al. | 348/221 |
| 5,585,844 A | 12/1996 | Hieda et al. | 348/224 |
| 5,585,848 A | 12/1996 | Hieda et al. | 348/297 |
| 5,606,366 A | 2/1997 | Hieda et al. | 348/297 |
| 5,712,680 A | 1/1998 | Hieda | 348/220 |
| 6,018,363 A * | 1/2000 | Horii | 348/219 |
| 6,047,102 A * | 4/2000 | Ohta | 348/220 |
| 6,069,994 A * | 5/2000 | Kozuki et al. | 348/220 |

FOREIGN PATENT DOCUMENTS

| | | | |
|---|---|---|---|
| JP | 06339080 | 6/1994 | H04N/5/335 |
| JP | 06-339080 | * 12/1994 | H04N/5/335 |
| JP | 0713173 | 5/1995 | H04N/5/335 |

* cited by examiner

Primary Examiner—Tuan Ho
(74) Attorney, Agent, or Firm—Fitzpatrick, Cella, Harper & Scinto (57) ABSTRACT

In order to provide an image pickup apparatus and an image pickup recording/reproducing apparatus capable of obtaining high-picture-quality still images and interlaced moving images, when an operational-mode switch sets a still-image mode, a CCD is driven by a driving circuit which outputs a signal having a frequency obtained by dividing the frequency of an output of an oscillator by a ½ frequency divider, and three signals shifted by one horizontal period from each other are obtained from a line memory block. When the operational-mode switch sets a moving-image mode, the CCD is driven by the driving circuit which outputs a signal having the frequency of the oscillator, and four signals, capable of being interlaced, shifted by one horizontal period from each other are obtained from the line memory block.

21 Claims, 3 Drawing Sheets

FIG.1

IMAGE PICKUP APPARATUS HAVING DIFFERENT PROCESSING RATES FOR STILL AND MOVING IMAGES

BACKGROUND OF THE INVENTION

1. Field of the Invention

The present invention relates to an image pickup apparatus for converting an image signal (which represents an image picked up using a solid-state image pickup device) into a digital video signal in one of a plurality of modes, and to an image pickup recording/reproducing apparatus for recording/reproducing an output from the image pickup apparatus.

2. Description of the Related Art

In accordance with recent progress in digital signal processing techniques, many image pickup recording/reproducing apparatuses, in which an image signal representing a picked-up image is subjected to digital processing and the resultant signal is recorded in/reproduced from a tape or a disk device as a digital video signal, have been proposed.

In these methods, an output signal from an image pickup device, such as a CCD (charge-coupled device) or the like, is subjected to an analog-to-digital conversion by an A/D (analog-to-digital) converter, and a resultant signal is processed by a digital-signal processing circuit to obtain a digital video signal, which is converted into recording data by a digital recording processing circuit, and the recording data is recorded on a tape or a disk device. A digital reproducing processing circuit forms a digital video signal from an output of the tape or the disk device, and outputs the formed signal to an external apparatus as a reproduced digital video signal.

However, the above-described conventional approach has the following problems.

That is, a reproduced digital video signal, in the conventional approach, is supplied to various kinds of external apparatuses. For example, after performing D/A (digital-to-analog) conversion, the obtained signal may be supplied to an ordinary television monitor, a still-image input apparatus or a moving-image input apparatus of a personal computer, a color printer, a video conference system, or the like.

These apparatuses may be grossly classified into apparatuses which deal with still-image data (still-image input apparatuses such as personal computers and color printers in the above-described examples), and apparatuses which deal with moving-image data (such as television monitors, video conference systems, and moving-image input apparatuses of personal computers in the above-described examples). In apparatuses which deal with still-image data, data having a number of pixels per frame as large as possible is required. Among apparatuses which deal with moving-image data, for example, NTSC-system television monitors deal with 2:1 interlaced images of 60 fields/sec and 240 lines in the vertical direction, and some other apparatuses deal with non-interlaced images of 30 frames/sec and 240 lines in the vertical direction although these values depend on the system, and the processing capability of a CPU used in the apparatus.

Recording/reproducing units used in the above-described conventional approach can record/reproduce only interlaced images of 60 fields/sec and 240 lines in the vertical direction. Hence, when a signal from such a unit is input to an apparatus which deals with a still image, particularly, resolution in the vertical direction is low, so that it is impossible to display or print an image in a large size, or only an image having a low picture quality is displayed or printed.

When intending to improve resolution by synthesizing interlaced images for two fields, if an object is moving, a moving portion becomes indented or blurred.

SUMMARY OF THE INVENTION

The present invention has been made in consideration of the above-described problems.

It is an object of the present invention to provide an image pickup apparatus which can obtain high-picture-quality still images and moving images capable of being interlaced, and an image pickup recording/reproducing apparatus which uses such a device.

In order to achieve the above-described object, according to one aspect of the present invention, an image pickup apparatus is configured according to the following items (1)–(5), (7) and (8), and an image pickup recording/reproducing apparatus is configured according to the following item (6).

(1) An image pickup apparatus for converting a signal representing an image picked up using an image pickup device (for example, a progressive-scanning-type device) for sequentially reading out outputs of respective pixels without adding the outputs into a digital signal, performing predetermined processing for the digital signal, and outputting a resultant signal includes an operational-mode switch to be set by an operator, a driving circuit capable of setting a horizontal transfer frequency for the image pickup device to a first frequency or to second frequency different from the first frequency, a memory block for delaying an output of the image pickup device by a predetermined number of lines, and control means for causing, when a first operational mode has been set by the operational-mode switch, the driving circuit to drive the image pickup device with a horizontal transfer frequency equal to the first frequency to cause a writing operation and a reading operation with respect to the memory block with the same frequency, and for causing, when a second operational mode has been set by the operational-mode switch, the driving circuit to drive the image pickup device with a horizontal transfer frequency equal to the second frequency to cause a writing operation and a reading operation with respect to the memory block with the second frequency and the first frequency, respectively.

(2) An image pickup apparatus described in item (1), wherein, when the second operational mode has been set, signals output from the memory block are interlaced.

(3) An image pickup apparatus described in item (1), wherein the memory block includes output terminals for out-putting a plurality of signals shifted by one horizontal period from each other.

(4) An image pickup apparatus described in item (1), further including signal processing means for performing signal processing using line correlation.

(5) An image pickup apparatus described in item (4), wherein the signal processing means performs signal processing using a vertical filter.

(6) An image pickup recording/reproducing apparatus, including an image pickup apparatus described in any one of items (1) through (5), for recording/reproducing an output of the image pickup device.

(7) An image pickup apparatus described in item (1), wherein the second frequency is twice the first frequency.

(8) An image pickup apparatus described in item (1). wherein the image pickup device is a progressive-scanning-type image pickup element.

The foregoing and other objects, advantages and features of the present invention will become more apparent from the following detailed description of the preferred embodiment taken in conjunction with the accompanying drawings.

According to another aspect of the present invention an image pickup apparatus includes image pickup means, a mode, switch for switching between a movie mode and a still mode, and drive means for driving the image pickup means in a first frequency in the movie mode and in a second, lower frequency in the still mode.

According to another aspect of the present invention, an image pickup apparatus which can operate in a still image mode and in a moving-image mode, includes a solid-state image pickup device for picking up an image and outputting electrical signals corresponding thereto and a line-memory block for storing lines of electrically signals output from said solid state image pickup device. Control means are provided for driving said line-block memory at a first frequency in the still image mode and at a second, different frequency in the moving image mode.

DETAILED DESCRIPTION OF THE PREFERRED EMBODIMENT

A preferred embodiment of the present invention will now be described in detail for use with a camcorder (image pickup recording/reproducing apparatus).

The present invention is not limited to a camcorder, but may also be applied to an image pickup apparatus which omits a recording/reproducing unit and provides a line output or a wireless output.

Figure 1:
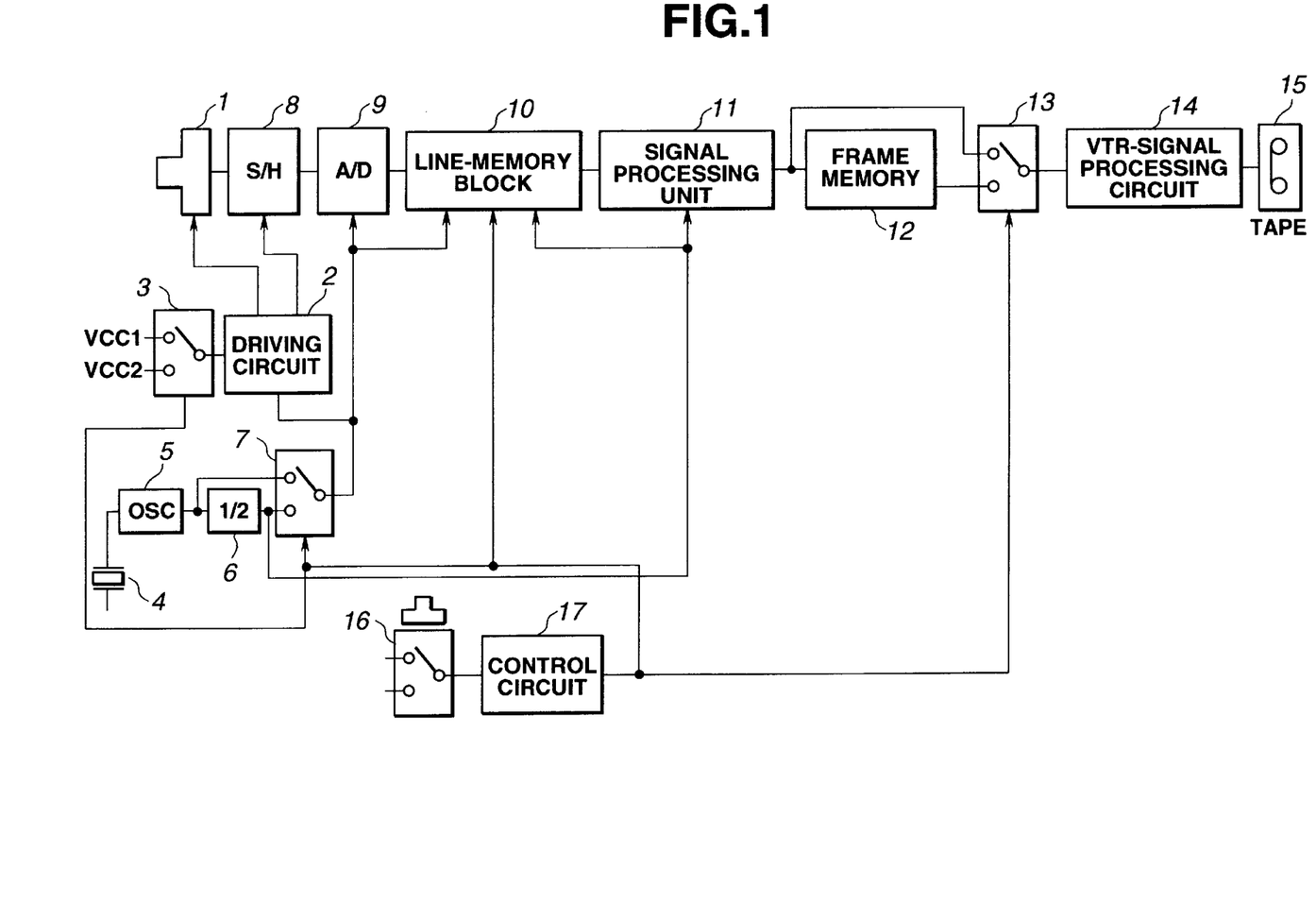
FIG. 1 is a block diagram illustrating the configuration of a camcorder (a video camera integrated with a VCR (video cassette recorder)) according to an embodiment of the present invention.

FIG. 1 is a block diagram illustrating the configuration of a camcorder according the embodiment.

In FIG. 1, reference numeral 1 represents a CCD, serving as an image pickup device, in which very small color filters are disposed on respective pixels on an image pickup surface, and which adopts a method of sequentially reading out charges accumulated in respective pixels without adding the charges of the respective pixels (an all-pixel reading-out method). There are also shown a driving circuit 2 for the CCD 1, a switch for changing the driving voltage for the driving circuit 2, a crystal oscillator 4, an oscillation circuit 5, a ½ frequency divider 6, a switch circuit 7, a sample-and-hold circuit 8 for converting the output signal of the CCD 1 into a continuous signal, and an A/D converter 9 for performing an analog-to-digital conversion. A line memory block 10 incorporates a plurality of line memories, and forms a delayed digital image signal from an input digital image signal. A signal processing circuit 11 forms a digital video signal including a digital color signal and a digital luminance signal from the output signal of the line memory block 10 using digital signal processing. A frame memory 12 stores input image data for one frame, and performs non-interlacing or interlacing conversion. Reference numeral 13 represents a switch circuit. In a recording operation, a VCR-signal processing circuit 14 adds an error-correcting code after compressing an input-digital video signal, converts the resultant signal into codes adapted to recording, and records the obtained codes on a tape. In a reproducing operation, the VCR-signal processing circuit 14 reproduces a digital video signal by performing code conversion, error correction and expansion, in a sequence reverse to the above-described sequence. Reference numeral 15 represents a tape. The operator sets an operational mode using a switch 16, i.e., sets one of a "still-image mode" of outputting image data adapted to a still image, and a "moving-image mode" of outputting image data adapted to a moving image. A control circuit 17 controls the operation of each unit in accordance with an output from the switch 16.

As for setting of an operational mode using the switch 16, the still-image mode is set when using a picked-up image as a still image, and the moving-image mode is set when using an picked-up image as a moving image. The control circuit 17 controls the switches 3 and 7, the line memory block 10, and the switch 13 based on this setting.

Each of the crystal oscillator 4 and the oscillator 5 generates a clock signal serving as reference for operational timings for the respective units, and the frequency divider 6 divides the frequency of the clock signal by two. The switch 7 selects the output of the frequency divider 6 and the output of the oscillator 5 when the switch 16 is set to the still-image mode and the moving-image mode, respectively, by the control of the control circuit 17. The output from the switch 7 is supplied as a clock signal for the driving circuit 2, the A/D converter 9, and the line memory block 10.

The switch circuit 3 selects a necessary voltage so as to drive the CCD 1 with a driving voltage suitable for the still-image mode or the moving-image mode by the control of the control circuit 17. The driving circuit 2 generates operational pulses for vertical transfer and horizontal transfer, and reading out of charges to a vertical transfer line of the CCD 1, and for the sample-and-hold circuit 8.

Next, a description will be provided of the flow of an image signal representing a picked-up image. The image of an object (not shown) is focused onto the photosensiving surface of the CCD 1 (after passing through very small color filters disposed thereon) by an image pickup optical system (not shown), and is converted into electric charges for each pixel according to photoelectric conversion. Since the CCD 1 adopts an all-pixel reading-out method, the charges are first read out on a vertical transfer line without being added and are vertically transferred. The charges are then subjected to charge-to-voltage conversion in an output unit after passing through a horizontal transfer line, and the obtained signal is output as the image signal representing the picked-up image. These transfer operations are effected by driving pulses from the driving circuit 2. Accordingly, when the output of the oscillator 5 is supplied to the driving circuit 2 via the switch 7, the transfer speed is twice the transfer speed when the output of the frequency divider 6 is supplied. The image pickup signal is converted into a continuous signal by the sample-and-hold circuit 8, is then converted into a digital image signal by the A/D converter 9, and is input to the line memory block 10. The line memory block 10 is controlled by the control circuit 17 so as to delay the input signal without being modified when the switch 16 sets the still-image mode, and to delay the input signal by halving the delay rate when the moving-image mode is set. At that time, interlacing processing is also performed by changing the number of delaying operations for an output signal for every field.

The output of the line memory block 10 is input to the signal processing circuit 11, which performs processing, such as color separation, contour emphasis, gamma correction, luminance/color-difference matrix processing, and the like, to form a digital video signal including a color signal and luminance signal. The digital video signal is input to the frame memory 12, where, in the still-image mode, a noninterlaced image is converted into an interlaced image, and the obtained signal is input to the VCR-signal processing circuit 14 via the switch circuit 13. In the moving-image mode, the digital video signal output from the signal processing circuit 11 is directly input to the VCR-signal processing circuit 14. The VCR-signal processing circuit 14 performs the above-described processing, and records the resultant signal on the tape 15. In a reproducing operation, a reproduced digital video signal is generated from data of the tape 15 according to VCR signal processing, and is output to an external apparatus directly or by being converted into an analog video signal by a D/A (digital-to-analog) converter (not shown).

The frame memory 12 is necessary when displaying an image picked up in the still-image mode on an apparatus which deals with an interlaced image, such as a television monitor or the like. However, the frame memory 12 may be omitted when outputting the image to a personal computer or a printer as data.

A description will now be provided of the operation of the switch circuit 3. Usually, in order to operate the CCD 1 at a high speed, it is necessary to increase the voltage of the CCD driving pulses for the purpose of obtaining a sufficient transfer efficiency. When generating driving pulses for realizing a high speed operation, a voltage loss in the output of the driving circuit 2 tends to increase as the frequency increases. In order to solve this problem, the voltage of the power supply for the driving circuit 2 is simultaneously changed when changing the driving frequency, so that a desired operation of the CCD 1 can be obtained even if the driving frequency is changed.

The signal processing circuit 11 always operates with a clock signal subjected to ½ frequency division. In order to perform the above-described processing, the signal processing circuit 11 is configured by a considerably large-scale logic circuit. Hence, power consumption greatly increases if this circuit is operated at a high speed. In the present embodiment, however, since the circuit is operated with a low clock frequency, it is possible to reduce power consumption.

Figure 2A:
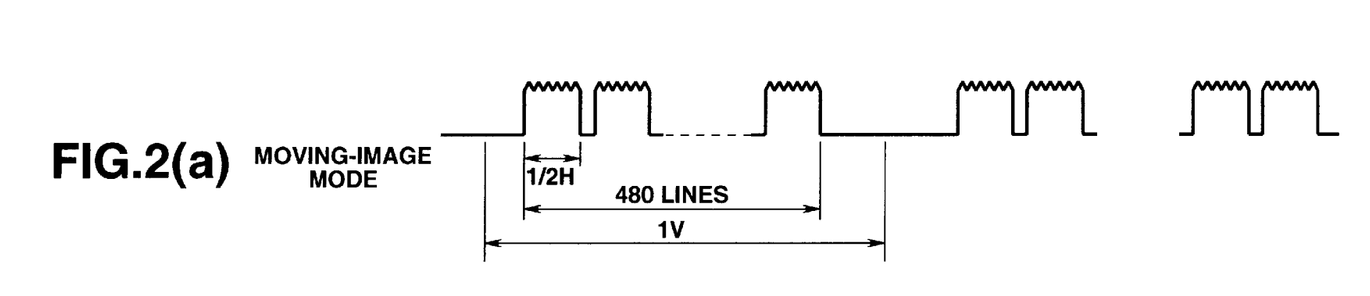
FIGS. 2(a) and 2(b) are diagrams illustrating output waveforms from the camcorder shown in FIG. 1.
Figure 2B:
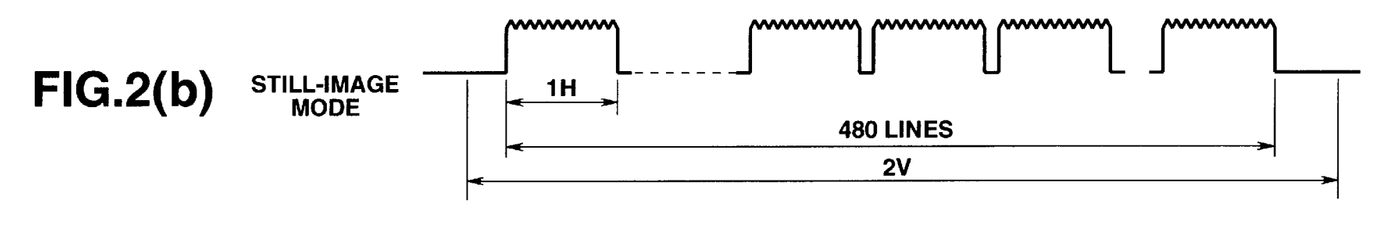

FIGS. 2(a) and 2(b) are diagrams illustrating output waveforms in the camcorder shown in FIG. 1.

FIG. 2(a) illustrates the output waveform of the CCD 1 in the moving-image mode. In this case, the period of output of one horizontal line is ½ of one ordinary horizontal period (½ H), and the number of effective scanning lines in one picture frame is 480. The output of one picture frame is obtained during one ordinary vertical period (1 V).

FIG. 2(b) illustrates the output waveform of the CCD 1 in the still-image mode. In this case, the period of output of one horizontal line equals one ordinary horizontal period (1 H), and the number of effective scanning lines in one picture frame is 480. The output of one picture frame is obtained during two ordinary vertical periods (2 V).

Figure 3A:
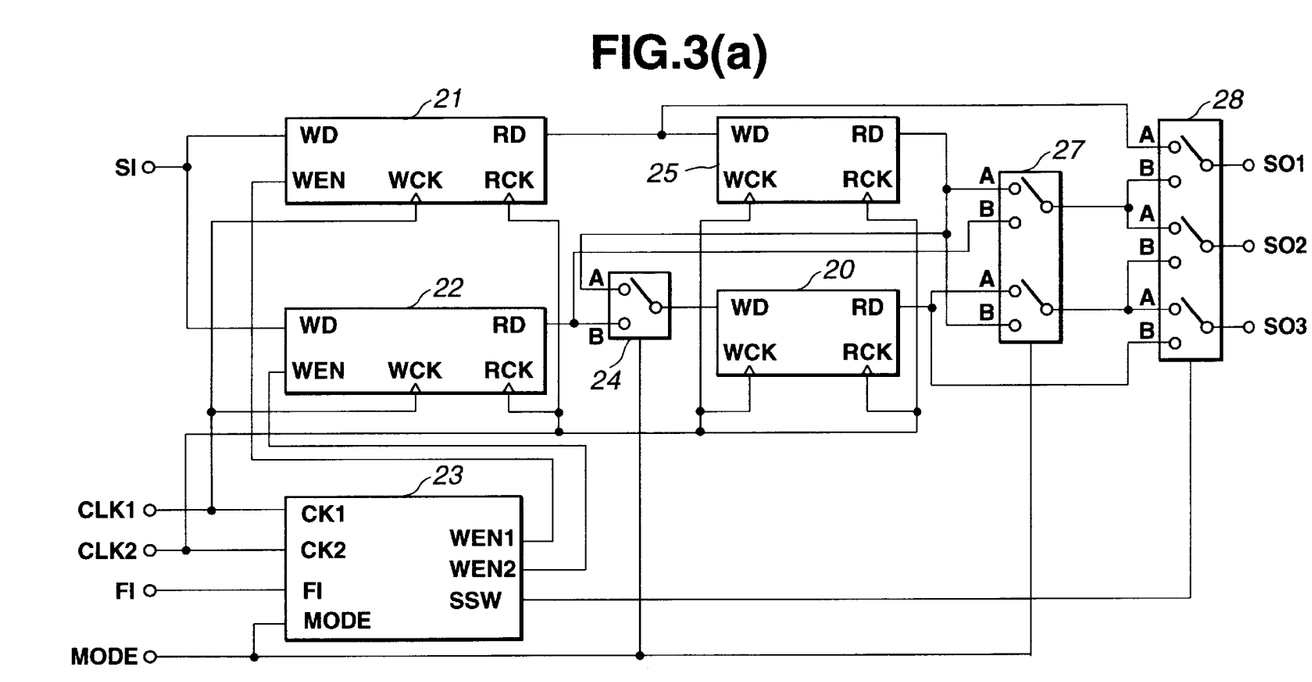
FIGS. 3(a) and 3(b) are diagrams illustrating the detail of a line memory block shown in FIG. 1.
Figure 3B:
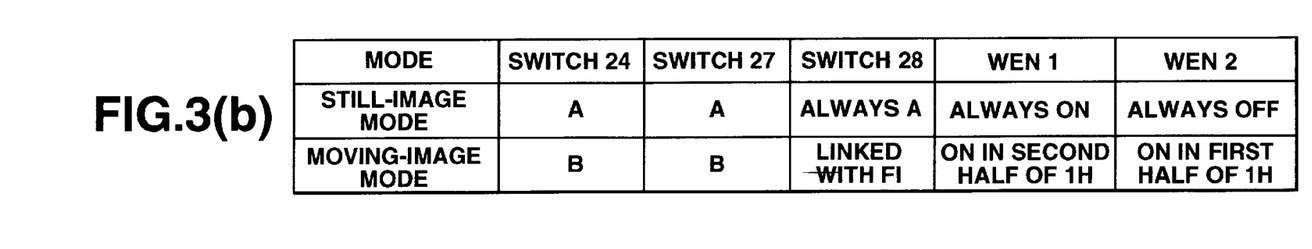

FIGS. 3(a) and 3(b) are diagrams illustrating the detail of the line memory block 10 shown in FIG. 1.

FIG. 3(a) is a block diagram of the line memory block 10. In FIG. 3(a), there are shown line memories 21, 22, 25 and 26. Each of the line memories 21 and 22 has a write control terminal (WEN). There are also shown a control circuit 23, and switch circuits 24, 27 and 28. A signal CLK1, serving as the output of the above-described switch circuit 7, a signal CLK2, serving as the output of the above-described frequency divider 6, a signal F1, serving as a field discrimination signal from a synchronizing-signal generator (not shown), and a signal MODE, serving as the Output of the above-described control circuit 17, are input to the control circuit 23. FIG. 3(b) illustrates the relationship between the respective operational modes, and the control states of the respective switches and the write control terminals of the line memories 21 and 22.

First, a description will be provided of the "still-image mode". An input digital image signal SI which is the output of the A/D converter 9 is written in the line memory 21 because the terminal WEN of the line memory 21 is ON. The output of the line memory 21 is output as a signal SO1 via the switch circuit 28, and is also input to the line memory 25 to be delayed for one horizontal period.

The output of the line memory 25 is output as a signal SO2 via the switch circuits 27 and 28, and is also input to the line memory 26 via the switch 24 to be further delayed for one horizontal period. The output of the line memory 26 is output as a signal SO3 via the switch circuits 27 and 28. That is, the signals SO1, SO2 and SO3 become outputs shifted by one horizontal period from each other.

Next, a description will be provided of an operation when setting the moving-image mode. The input signal SI is first simultaneously input to the line memories 21 and 22. In the moving-image mode, as shown in the table of FIG. 3(b), since the write control terminals WEN's of the line memories 21 and 22 become ON in the first half and the second half of 1 H, respectively) the signal SI is written in the line memories 22 and 21 in the first half and in the second half of 1 H, respectively. Since the write clock signal at that time is CLK1, it has a frequency twice the frequency of the read clock signal CLK2. The output of the line memory 21 is read in accordance with the above-described CLK2. At that time, since a writing operation is performed at the second half of 1 H, read data is data preceding the data of the current line by 1 H. The input signal SI is written in the line memory 22 in the first half of 1 H, and the written data is read without being modified. Hence, the read data is data of the current line.

The output of the line memory 21 is first input to the switch circuit 28 as well as to the line memory 25. The output of the line memory 22 is first input to the switch circuit 28 via the switch circuit 27, as well as to the line memory 26 via the switch circuit 24. The output of the line memory 25 is input to the switch circuit 28 via the switch circuit 27. The output of the line memory 26 is input to the switch circuit 28.

As described above, four signals are input to the switch circuit 28. These signals are shifted by one pixel from each other in the vertical direction. As shown in the table of FIG. 3(b), the switch circuit 28 selects one group of contacts A and B for these signals in accordance with the field discriminating signal FI. When the contacts A have been selected, the outputs of the line memories 21, 22 and 25 are output to the terminals SO1, SO2 and SO3, respectively. When the contacts B have been selected, the outputs of the line memories 22, 25 and 26 are output to the terminals SO1, SO2 and SO3, respectively. When the contacts A are selected, the signal is shifted by one pixel in the vertical direction compared with when the contacts B are selected. By thus switching the switch 28 in accordance with the FI in the above-described manner, signals output to the terminals SO1, SO2 and SO3 are interlaced.

In FIG. 3, three outputs are provided from the line memory block 10, because signal processing using 3-line correlation using a CCD having color filters with Bayer arrangement is considered. When using, for example, a signal processing circuit for forming a digital video signal output only from an output for one line, the line memory 26 is unnecessary. On the other hand, when using a signal processing circuit using 5-line correlation, it is necessary to add another line memory.

In the still-image mode, in the configuration shown in FIG. 3(a), it is possible to obtain five outputs without increasing the number of line memories by using the input signal and by further delaying the output of the line memory 26 by one line by switching the input of the line memory 22. For example, it is possible to perform higher-performance signal processing, such as a 5-tap vertical filter or the like, using these five outputs.

As described above, according to the present embodiment, it is possible to record/reproduce a high-picture-quality still image, and moving images capable of being interlaced.

As described above, according to the present invention, it is possible to obtain a high-picture quality still image, and moving images capable of being interlaced.

The individual components designated by blocks in the drawings are all well-known in the image pickup apparatus arts and their specific construction and operation are not critical to the operation or the best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image pickup apparatus for converting a signal representing an image picked up using an image pickup device performing predetermined processing on the digital signal, and outputting a resultant signal, said device comprising an operational-mode switch;

a driving circuit capable of setting a horizontal transfer frequency for the image pickup device to a first frequency or to a second frequency higher than the first frequency;

a memory block for storing signals output from the image pickup device;

a signal processing circuit for processing signals output from said memory block, wherein said signal processing circuit performs color processing; and control means for causing, when a first operational mode has been set by said operational-mode switch, said driving circuit to drive the image pickup device with a horizontal transfer frequency equal to the first frequency to cause a writing operation and a reading operation with respect to said memory block to be performed at the same frequency, and for causing, when a second operational mode has been set by said operational-mode switch, said driving circuit to drive the image pickup device with the horizontal transfer frequency equal to the second frequency to cause the writing operation and the reading operation with respect to said memory block to be performed at the second frequency and at the first frequency, respectively, wherein, when said first operational mode or said second operational mode have been set by said operational-mode switch, said driving circuit drives said signal processing circuit with a frequency equal to the first frequency.

2. An image pickup apparatus for converting a signal representing an image picked up using an image pickup device performing predetermined processing on the digital signal, and outputting a resultant signal, said device comprising:

an operational-mode switch;

a driving circuit capable of setting a horizontal transfer frequency for the image pickup device to a first frequency or to a second frequency different from the first frequency;

a memory block for storing signals output from the image pickup device; and control means for causing, when a first operational mode has been set by said operational-mode switch, said driving circuit to drive the image pickup device with a horizontal transfer frequency equal to the first frequency to cause a writing operation and a reading operation with respect to said memory block to be performed at the same frequency, and for causing, when a second operational mode has been set by said operational-mode switch, said driving circuit to drive the image pickup device with the horizontal transfer frequency equal to the second frequency to cause the writing operation and the reading operation with respect to said memory block to be performed at the second frequency and at the first frequency, respectively, where the reading frequency with respect to the memory block is lower in the second mode, and wherein, when the second operational mode has been set, said control means causes signals output from said memory block to be interlaced.

3. An image pickup apparatus for converting a signal representing an image picked up using an image pickup device performing predetermined processing on the digital signal, and outputting a resultant signal, said device comprising:

an operational-mode switch;

a driving circuit capable of setting a horizontal transfer frequency for the image pickup device to a first frequency or to a second frequency different from the first frequency;

a memory block for storing signals output from the image pickup device; and control means for causing, when a first operational mode has been-set by said operational-mode switch, said driving circuit to drive the image pickup device with a horizontal transfer frequency equal to the first frequency to cause a writing operation and a reading operation with respect to said memory block to be performed at the same frequency, and for causing, when a second operational mode has been set by said operational-mode switch, said driving circuit to drive the image pickup device with the horizontal transfer frequency equal to the second frequency to cause the writing operation and the reading operation with respect to said memory block to be performed at the second frequency and at the first frequency, respectively, wherein said memory block includes output terminals for outputting a plurality of signals shifted by one horizontal period from each other.

4. An image pickup apparatus for converting a signal representing an image picked up using an image pickup device performing predetermined processing on the digital signal, and outputting a resultant signal, said device comprising:

an operational-mode switch;

a driving circuit capable of setting a horizontal transfer frequency for the image pickup device to a first frequency or to a second frequency different from the first frequency;

a memory block for storing signals output from the image pickup device;

control means for causing, when a first operational mode has been set by said operational-mode switch, said driving circuit to drive the image pickup device with a horizontal transfer frequency equal to the first frequency to cause a writing operation and a reading operation with respect to said memory block to be performed at the same frequency, and for causing, when a second operational mode has been set by said operational-mode switch, said driving circuit to drive the image pickup device with the horizontal transfer frequency equal to the second frequency to cause the writing operation and the reading operation with respect to said memory block to be performed at the second frequency and at the first frequency, respectively; and signal processing means, coupled to said memory block, for performing signal processing using line correlation.

5. An image pickup apparatus according to claim 4, wherein said signal processing means performs signal processing using a vertical filter.

6. An image pickup recording/reproducing apparatus, comprising an image pickup apparatus according to any one of claims 1 through 5, for recording/reproducing an output of said image pickup apparatus.

7. An image pickup apparatus according to claim 1, wherein the second frequency is twice the first frequency.

8. An image pickup apparatus according to claim 1, wherein the image pickup device comprises a progressive-scanning-type image pickup device.

9. An image pickup apparatus comprising:

(a) image pickup means;

(b) a mode switch for switching between a movie mode and a still mode;

(c) drive means for driving said image pickup means in a first frequency in said movie mode and in a second frequency lower than said first frequency in said still mode;

(d) memory means for storing signals output from said image pickup means;

(e) processing means for processing signals output from said means for storing means, wherein said processing means performs color processing; and (f) control means for causing, when said movie mode has been set by said mode switch, said drive means to drive said image pickup means with a frequency equal to the first frequency to cause the writing operation and the reading operation with respect to said memory means to be performed at the first frequency and at the second frequency, respectively, and for causing, when said still mode has been set by said mode switch, drive means to drive the image pickup means with the frequency equal to the second frequency to cause a writing operation and a reading operation with respect to said memory means to be performed at the same frequency, wherein when said movie mode or said still mode have been set by said mode switch, said drive means drives the processing means with a frequency equal to the second frequency.

10. An apparatus according to claim 9, wherein said second frequency is half of said first frequency.

11. An apparatus according to claim 9, wherein said first and second frequencies correspond to horizontal frequencies.

12. Image pickup apparatus which can operate in a still mode or a moving-image mode, comprising:

an operational-mode switch;

a solid-state image pickup device for picking up an image and outputting electrical signals corresponding thereto;

a driving circuit capable of setting a horizontal transfer frequency for the solid-state image pickup device to a first frequency or to a second frequency;

a line-memory block for storing lines of electrical signals output by said solid-state image pickup device;

a signal processing circuit for processing signals output from said line-memory block, wherein said signal processing circuit performs color processing; and control circuitry for driving the line-memory block at a first frequency in the still image mode and at a second, different frequency in the moving image mode, wherein, when said image pickup device is in the still mode or the moving-image mode, said driving circuit drives said signal processing circuit with a frequency equal to the first frequency.

13. Apparatus according to claim 12, wherein the first frequency is lower than said second frequency.

14. Apparatus according to claim 13, wherein said first frequency is substantially one half of said second frequency.

15. Apparatus according to claim 13, wherein each of said first and second frequencies corresponds to a horizontal frequency.

16. Apparatus according to claim 12 incorporated into a camcorder.

17. Apparatus according to claim 16, wherein said solid-state image pickup device comprises a CCD unit.

18. Image pickup apparatus which can operate in a still mode or a moving-image mode, comprising:

a solid-state image pickup device for picking up an image and outputting electrical signals corresponding thereto;

a line-memory block for storing lines of electrical signals output by said solid-state image pickup device; and control circuitry for driving the line-memory block at a first frequency in the still image mode and at a second, different frequency in the moving image mode, wherein said control circuitry causes said line-memory block to delay lines of electrical signals in said moving image mode at half the delay rate as compared to the still image mode.

19. Image pickup apparatus which can operate in a still mode or a moving-image mode, comprising:

a solid-state image pickup device for picking up an image and outputting electrical signals corresponding thereto;

a line-memory block for storing lines of electrical signals output by maid solid-state image pickup device; and control circuitry for driving the line-memory block at a first frequency in the still image mode and at a second, different frequency in the moving image mode, wherein said control circuitry causes a write clock frequency to be substantially twice a read clock frequency in the moving image mode.

20. Image pickup apparatus which can operate in a still mode or a moving-image mode, comprising: p1 a solid-state image pickup device for picking up an image and outputting electrical signals corresponding thereto;

a line-memory block for storing lines of electrical signals output by said solid-state image pickup device; and control circuitry for driving the line-memory block at a first frequency in the still image mode and at a second, different frequency in the moving image mode, wherein said control circuitry causes the same number of lines of electrical signals to be read in the moving-image mode in substantially one half the time as the same number of lines of electrical signals are read in the still-image mode.

21. Image pickup apparatus which can operate in a still mode or a moving-image mode, comprising:

a solid-state image pickup device for picking up an image and outputting electrical signals corresponding thereto;

a line-memory block for storing lines of electrical signals output by said solid-state image pickup device;

control circuitry for driving the line-memory block at a first frequency in the still image mode and at a second, different frequency in the moving image mode;

a signal processing unit for receiving electrical signals output from said line-memory block; and a frame memory for storing electrical signals output from said signal processing unit.

\* \* \* \* \*

UNITED STATES PATENT AND TRADEMARK OFFICE
CERTIFICATE OF CORRECTION

PATENT NO. : 6,377,301 B1
DATED : April 23, 2002
INVENTOR(S) : Teruo Hieda

It is certified that error appears in the above-identified patent and that said Letters Patent is hereby corrected as shown below:

<u>Title page,</u>
Item [56], References Cited, FOREIGN PATENT DOCUMENTS: "JP 06339080 6/1994 H04N/335" should be deleted.
"0713173" should read -- 7-131713 --.

<u>Column 2,</u>
Line 50, "out-putting" should read -- outputting --.

<u>Column 6,</u>
Line 5, "Output" should read --output --.

<u>Column 7,</u>
Line 46, "prising" should read -- prising: --.

<u>Column 8,</u>
Line 55, "been-set" should read -- been set --.

<u>Column 9,</u>
Line 58, "means for storing means" should read -- memory means for storing --.

<u>Column 10,</u>
Line 5, "have" should read -- has --.
Line 42, "claim 12" should read -- claim 12, --.
Line 65, "maid" should read -- said --.

UNITED STATES PATENT AND TRADEMARK OFFICE
CERTIFICATE OF CORRECTION

PATENT NO.    : 6,377,301 B1
DATED         : April 23, 2002
INVENTOR(S)   : Teruo Hieda It is certified that error appears in the above-identified patent and that said Letters Patent is hereby corrected as shown below:

<u>Column 11,</u>
Line 6, "p1 a solid-state" should read -- ¶ a solid-state --.

Signed and Sealed this

Seventh Day of January, 2003

JAMES E. ROGAN
*Director of the United States Patent and Trademark Office*